United States Patent [19]

Grout

[11] Patent Number: 5,913,033
[45] Date of Patent: Jun. 15, 1999

[54] APPARATUS AND METHOD FOR RETRIEVING INFORMATION USING STANDARD OBJECTS

[75] Inventor: Gordon Blair Grout, Pine Island, Minn.

[73] Assignee: International Business Machines Corporation, Armonk, N.Y.

[21] Appl. No.: 08/771,735

[22] Filed: Dec. 20, 1996

[51] Int. Cl.[6] .................................................... G06F 13/00
[52] U.S. Cl. ...................................................... 395/200.49
[58] Field of Search .................... 395/200.32, 200.33, 395/200.47, 200.48, 200.49, 200.51, 200.54, 200.57, 200.58, 200.59, 200.6, 200.76, 200.79, 680, 682

[56] References Cited

U.S. PATENT DOCUMENTS

| | | | |
|---|---|---|---|
| 5,127,003 | 6/1992 | Doll et al | 370/259 |
| 5,414,808 | 5/1995 | Williams | 345/328 |
| 5,418,908 | 5/1995 | Keller et al. | 395/200.48 |
| 5,530,852 | 6/1996 | Meske, Jr. et al. | 395/200.36 |
| 5,572,643 | 11/1996 | Judson | 395/200.48 |
| 5,630,066 | 5/1997 | Gosling | 395/200.51 |
| 5,644,751 | 7/1997 | Burnett | 711/113 |
| 5,706,502 | 1/1998 | Foley et al. | 395/682 |
| 5,710,883 | 1/1998 | Hong et al. | 395/200.36 |
| 5,721,908 | 2/1998 | Lagarde et al. | 395/200.32 |
| 5,732,219 | 3/1998 | Blumer et al. | 395/200.57 |
| 5,737,536 | 4/1998 | Herrmann et al. | 395/200.59 |

OTHER PUBLICATIONS

"Web Server: Security Lockdown", by Michael Lee, Network Computing, Sep. 15, 1996, v 714, p. 79.

DA892–0985, I. R. Eisen and S. N. Parikh, Mailing Multimedia Hyperlinked Documents, Published in Research Disclosure, Jun. 1993, No. 06.

*Primary Examiner*—Moustafa M. Meky
*Attorney, Agent, or Firm*—Owen J. Gamon

[57] ABSTRACT

A document manager runs at a client computer and retrieves documents downloaded from a server computer across a communications medium. The documents can contain embedded links to objects, which are building blocks that make up or are associated with the documents. The client computer keeps a local copy of a standard-set of objects, so that when the client computer needs to present the linked objects to the user, the linked objects that are part of the standard-set do not need to be retrieved from the server by the client. When a linked object is needed, the document manager parses the embedded link to the object and extracts the file name of the object. The document manager then searches a name list, which contains all the names of objects in the standard-set. If the file name from the link is in the name list, the document manager uses the object of the same name in the local copy of the standard-set. If the file name is not in the name list, the document manager retrieves the linked object using the full embedded link.

47 Claims, 10 Drawing Sheets

APPARATUS AND METHOD FOR RETRIEVING INFORMATION USING STANDARD OBJECTS

FIELD OF THE INVENTION

This invention relates to the information processing field. More particularly, this invention relates to a retrieval mechanism for enhancing access to information using standard objects.

BACKGROUND

The Internet is an interconnected network of computers. The World Wide Web (WWW) is a network of Internet documents that supports embedded hyperlinks between documents, a graphical user interface, and extensive use of multimedia capabilities. A hyperlink is a network address embedded in a document. The hyperlink is activated when the user selects a highlighted item (such as a word, phrase, icon, or picture) displayed using a browser graphical interface.

A browser is a utility at one computer, called a client, that looks for and browses information on other computers, called servers, all of which are connected via the Internet. Examples of browsers are IBM's Web Explorer, Netscape Navigator, and NCSA (National Center for Supercomputing Applications) Mosaic. The server computer typically has a program, called a "daemon", that runs continuously, waiting for and servicing requests from browsers at the client computers.

In order to browse a document at a server, the user enters a Uniform Resource Locator (URL), which is an address of the desired document at the server, via the browser at the client computer. The browser at the client computer uses this URL to communicate with an HTTP (HyperText Transfer Protocol) daemon executing on the WWW server computer. HTTP is the protocol used by WWW computers to communicate to each other using these hyperlinks. The HTTP daemon at the WWW server then transmits the document specified by the URL in HTML (HyperText Markup Language) format to the client browser for presentation to the user. The retrieved document may itself contain further embedded URLs linking to multimedia objects (such as bitmaps, sound files, or video files), so the client browser parses the retrieved document and downloads the linked multimedia objects for presentation via display or playback.

Documents on the WWW are becoming more complex—including increasingly more embedded, multimedia objects—as producers of such documents attempt to make them more informative, distinctive, and exciting. Features in some WWW browsers, such as Netscape Navigator's ability to tile the browser's background with a bitmap downloaded from the WWW server, are facilitating this increase in the use of multimedia objects, and in particular the use of digitized images. This increasing use of multimedia objects, which can require a large amount of data transfer, adversely affects the performance of WWW servers, slows the response time experienced by users, and burdens the communication lines over which the data is transmitted. Also, the number of users of the Internet is steadily increasing, which busies servers even more, further burdening transmission lines and slowing the performance of all Internet data transfers.

Producers of WWW documents must consider that users will be more likely to access their documents if the document download time is relatively short. Thus, there is a tradeoff between use of linked, multimedia objects to make a document look and sound appealing and the likelihood that the user will endure the wait to download all the linked objects in order to view the document. Both WWW document developers and users would benefit if this tradeoff problem were alleviated.

Finally, since multimedia objects can be downloaded from a server in one country to a client in another country with a possibly very different culture, the language or gesture depicted by the multimedia object may be unclear or misleading to the reader. This is unavoidable currently, since each multimedia object is downloaded from one specific location on one specific server, so all clients at all locations receive a copy of the same, possibly origin-specific, object.

Some previous browsers have attempted to address some of these problems via caching mechanisms. Both memory caches that use, for example, random access memory (RAM) and disk caches that use media storage, such as fixed disk drives, have been used by browsers to store previously fetched WWW documents and their associated multimedia objects so that, if needed in the future, no further Internet transactions are necessary to retrieve them. Caching thus requires fetching every object at least once from the appropriate Internet server.

Caching mechanisms suffer from the problem that the cache contents are eventually recycled, that is, as more and more documents contain multimedia objects, the demand on the cache grows and eventually it fills up, so objects already in the cache are deleted to make room for newly fetched objects. The browser uses an algorithm to decide which cached object to delete, such as a first-in-first-out or least-recently-used algorithm. Once an object has been deleted from the cache, the browser must fetch it again from the server when the object is subsequently needed.

A further feature of some browsers allows the user to specify documents and multimedia objects of the user's choice as being "permanently" cached, i.e., exempt from the deletion process previously described. A permanent cache suffers from the following two deficiencies. First, caching does not address in any way the aforementioned problems associated with the culture or language that originated the object being different from the culture or language of the viewing user. Second, a permanent cache has a limited ability to recognize that it already contains an object, which causes the browser to request the same object multiple times from a server even though the permanent cache already contains the object.

This limited ability of the permanent cache to recognize an object stems from the fact that a permanent cache only keeps track of its cached objects by their complete URLs, including server name, directory name, and file name. Yet a document can link to the same object using different URLs, so that the permanent cache mistakenly believes that an object is not in the cache because its URL is different from when it was previously cached. For example, the same, identical object may exist on different servers or in different directories on the same server. Thus, the URLs of identical objects will be different, so the browser will unnecessarily retrieve the object multiple times even though the object is already contained in the permanent cache.

For the foregoing reasons, there is a need for a mechanism that increases the performance of browsing WWW documents without sacrificing their multimedia nature and that allows downloading of multimedia objects tailored for the user's language or culture.

SUMMARY

It is an object of the present invention to enhance user access to information.

It is another object of the present invention to provide an enhanced document manager.

It is a further object to provide an enhanced document manager that provides increased performance.

It is a further object to provide an enhanced document manager that creates less transmission traffic on the Internet.

It is a further object to provide an enhanced document manager that facilitates better understanding by the user of the meaning of the document being browsed due to the internationalizatiou of the embedded objects linked by the document.

These and other objects are achieved by a document manager that uses a standard set of objects. The document manager runs at a client computer and retrieves documents downloaded from a server computer across a communications medium. The documents can contain embedded links to objects, which are building blocks that make up or are associated with the documents. The client computer keeps a local copy of a standard-set of objects, so that when the client computer needs to present the linked objects to the user, the linked objects that are part of the standard set do not need to be retrieved from the server by the client.

When a linked object is needed, the document manager parses the embedded link to the object and extracts the tile name of the object. The document manager then searches a name list, which contains all the names of objects in the standard-set. If the file name from the link is in the name list, the document manager uses the object of the same name in the local copy of the standard-set. If the file name is not in the name list, the document manager retrieves the linked object using the full embedded link.

In accordance with the preferred embodiment, network traffic is reduced and performance of the document manager is increased because the client needs to retrieve fewer linked objects from the server. Also, the user's comprehension of and satisfaction with the linked objects increase because the copy of the standard-set can be specific to the user's locale, culture, or language.

DETAILED DESCRIPTION OF PREFERRED EMBODIMENT

As a general overview, document manager uses a standard-set of objects. The document manager runs at a client computer and retrieves documents downloaded from a server computer across a communications medium The documents can contain embedded links to objects, which are building blocks that make up or are associated with the documents. The client computer keeps a local copy of a standard-set of objects or a portion thereof, so that when the client computer needs to present the linked objects to the user, the linked objects that are part of the standard-set do not need to be retrieved from the server by the client. When a linked object is needed, the document manager parses the embedded link to the object and extracts the file name of the object. The document manager then searches a name list, which contains all the names of objects in the standard-set. If the file name from the link is in the name list, the document manager uses the object of the same name in the local copy of the standard-set. If the file name is not in the name list, the document manager retrieves the linked object using the full embedded link.

Figure 1A:
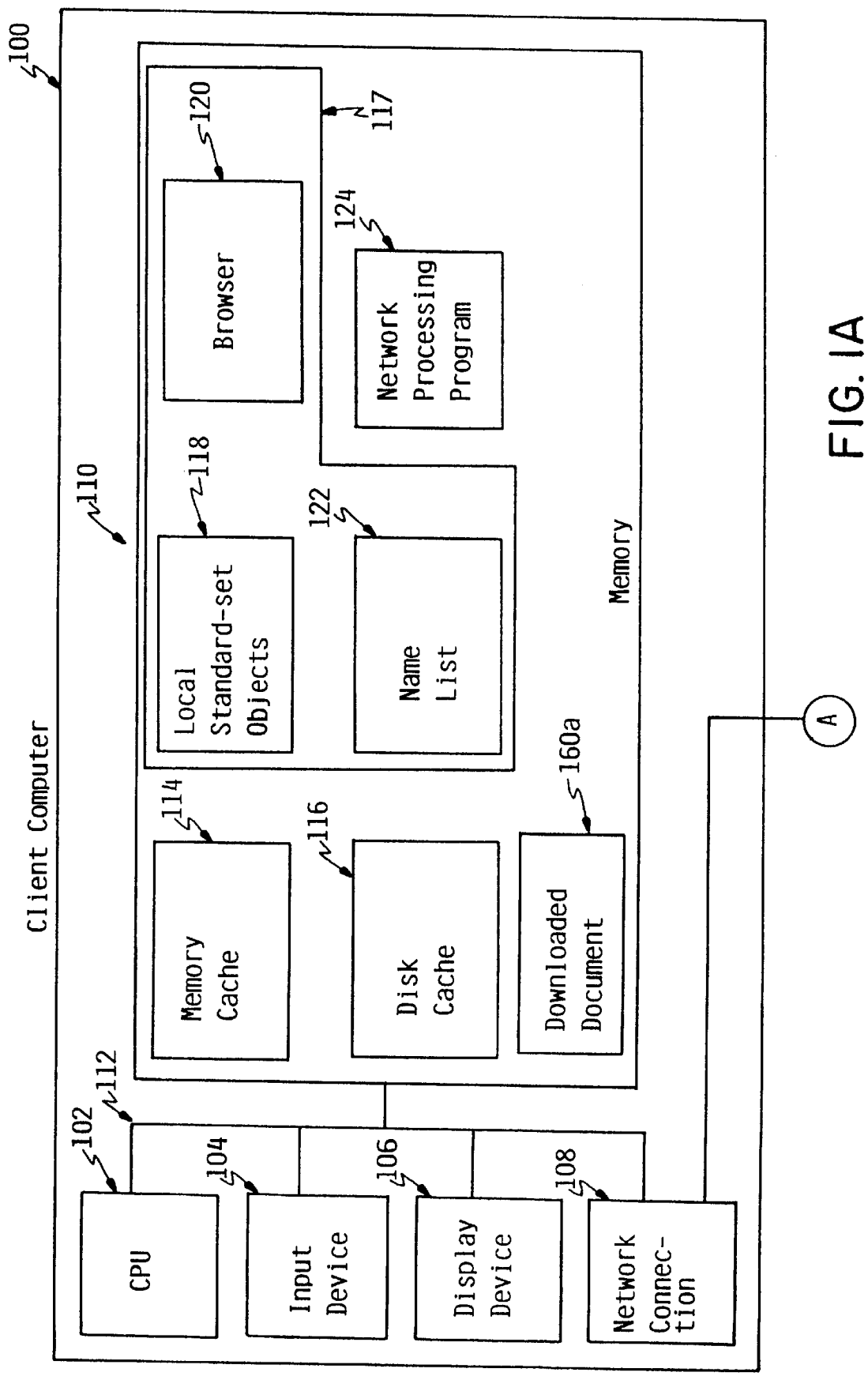
FIG. 1 is a block diagram that shows a client computer attaching to a document-server computer and a standard-set server computer via a network according to the preferred embodiment.
Figure 1B:
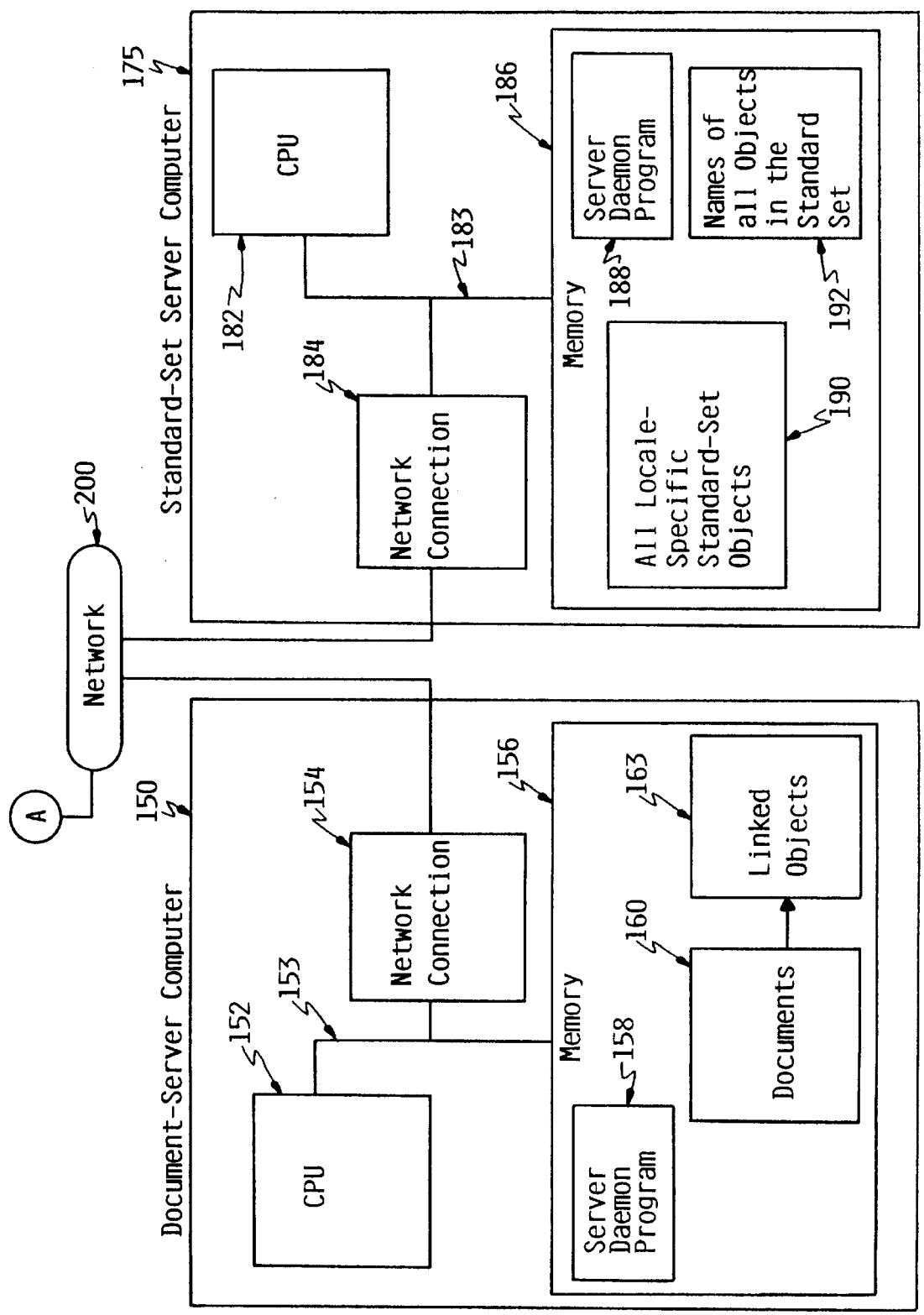

With reference now to the figures and in particular with reference to FIG. 1, there is depicted a block diagram of a data processing system in which a preferred embodiment may be implemented. Computer 100 functioning as a client is shown connected via network 200 to document-server computer 150 and to standard-set server computer 175. In the preferred embodiment, network 200 is the Internet, although it could be another kind of network such as a Local Area Network (LAN) or an Intranet.

Client computer 100 contains Central Processing Unit (CPU) 102, which is a processor connected via bus 112 to input device 104, display device 106, network connection 108, and memory 110.

Input device 104 can be any suitable device for the user to give input to client computer 100; for example: a keyboard, keypad, light pen, touchscreen, button, mouse, trackball, or speech recognition unit could be used. Display device 106 could be any suitable output device, such as a display screen, text-to-speech converter, printer, television set, or audio player. Although input device 104 is shown as being separate from display device 106, they could be combined; for example: a display with an integrated touchscreen, a display with an integrated keyboard, or a speech-recognition unit combined with a text-to-speech converter.

Memory 110 is storage sufficiently large to hold the necessary programming and data structures. While memory 110 is shown as a single entity, memory 110 may in fact comprise a plurality of storage devices, and that memory may exist at multiple levels, from high-speed registers and caches to lower speed but larger DRAM chips, to floppy-disk drives, fixed-disk drives, tape drives, CD-ROM drives, or optical drives. Memory 110 contains memory cache 114, disk cache 116, document manager 117, downloaded document 160a, and network processing program 124. Document manager 117 contains local standard-set objects 118, browser 120, and name list 122. Network processing program 124 contains instructions that, when executed on CPU 102, provide support for connecting client computer 100 to computers in network 200 such as document-server 150 and standard-set server computer 175. CPU 102 is suitably programmed by browser 120 as is further described in the description for FIGS. 4, 5, and 6. In the alternative, the function of browser 120 could be implemented by control circuitry through the use of logic gates, programmable-logic devices, or other hardware components in lieu of a processor-based system.

Memory cache 114 is a RAM cache used to store fetched WWW documents and their associated multimedia objects, as will be later described under the description for FIGS. 4, 5, and 6. Disk cache 116 is a cache in secondary storage used to store fetched WWW documents and their associated multimedia objects, as will be later described under the description for FIGS. 4, 5, and 6.

Figure 2A:
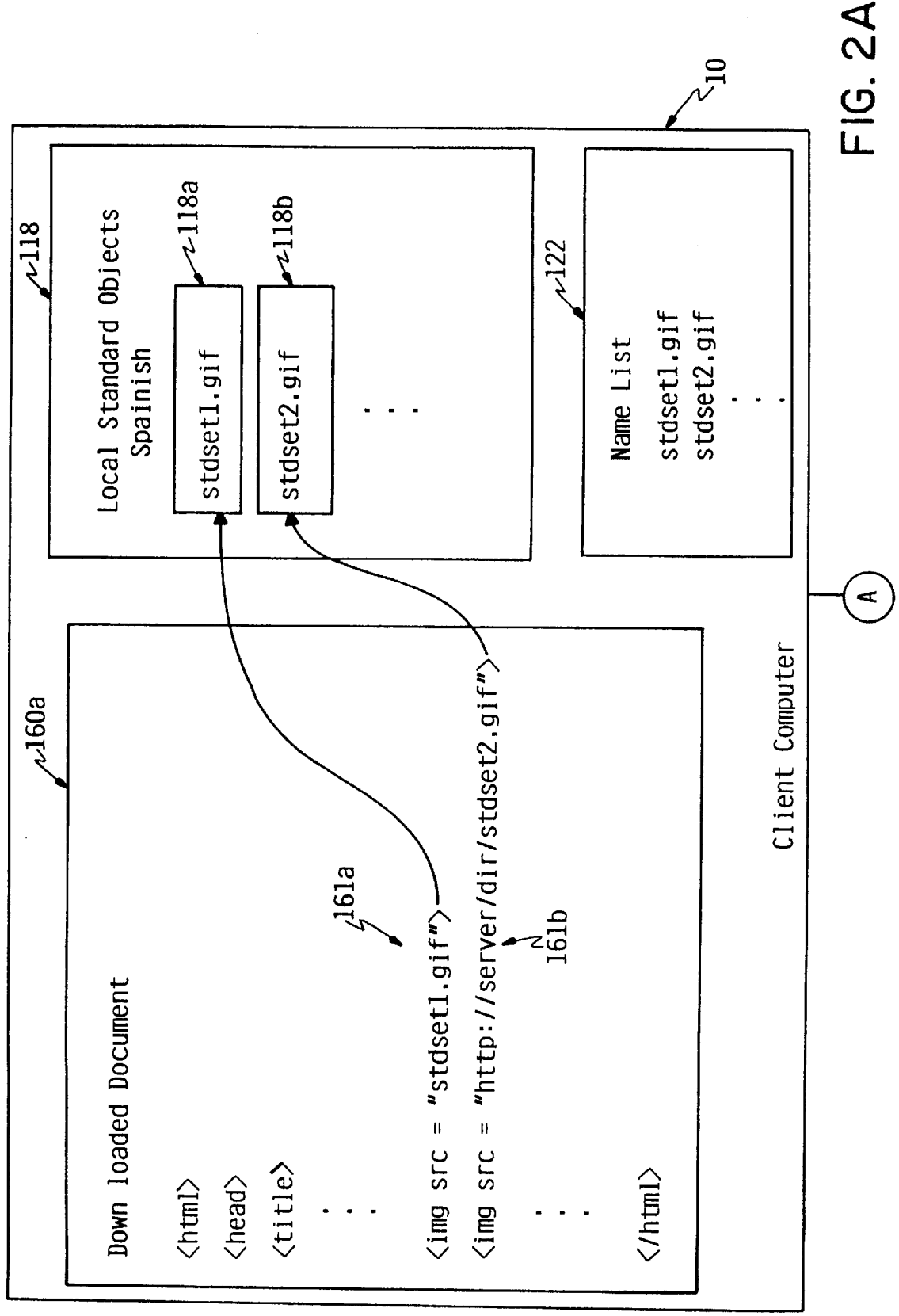
FIG. 2 is a block diagram of an example of a document and its relationship to standard-set objects and linked objects.
Figure 2B:
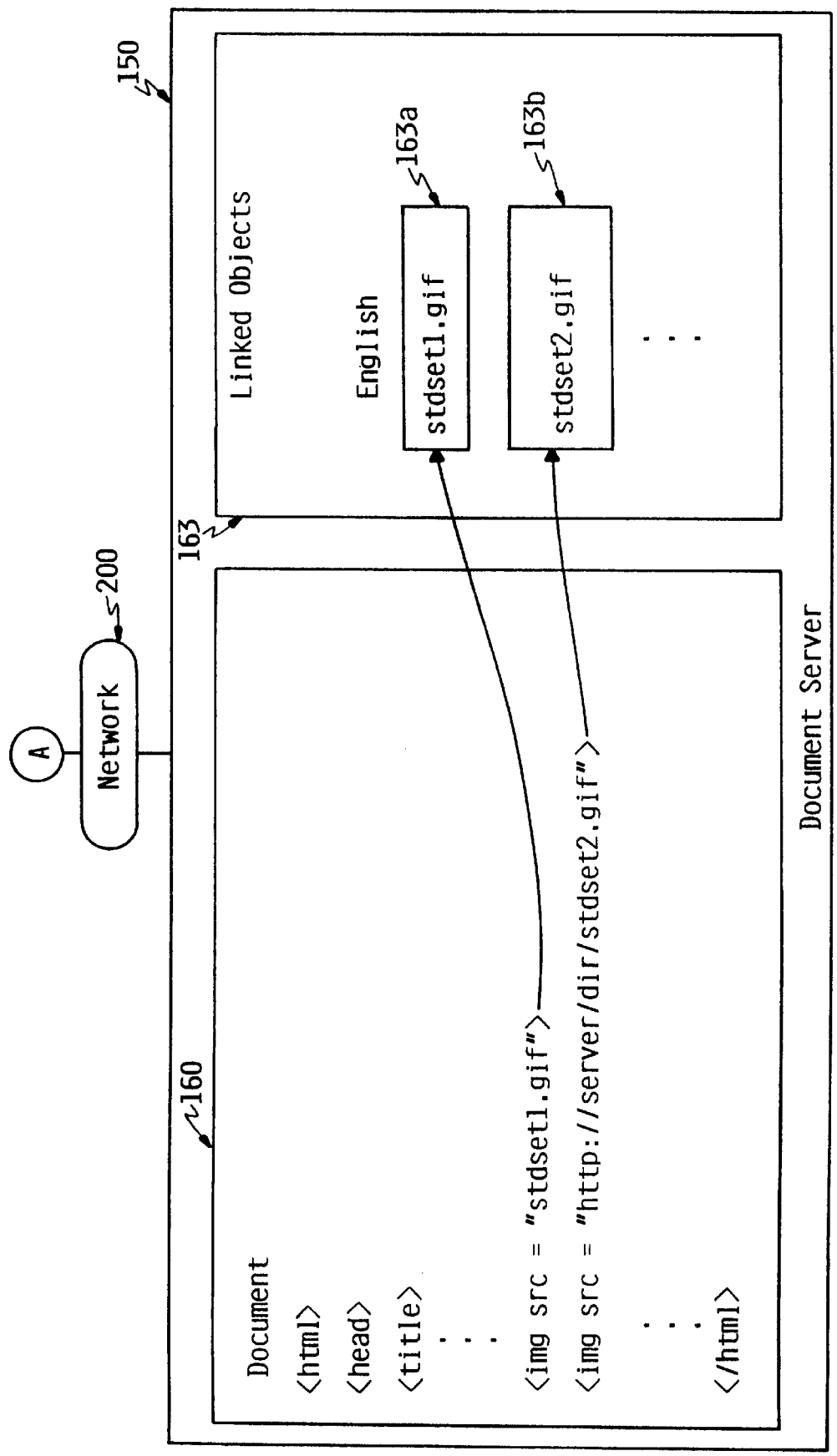

Local standard-set objects 118 are objects in the standard-set and may be specific to the user's locale. Local standard-set objects 118 may have been initially loaded from standard-set server 175. They may also be stored on a CD-ROM, a diskette, other secondary storage, or a Local Area Network or Intranet (not shown). Examples of local standard-set objects 118 are shown in FIG. 2. In a preferred embodiment, name list 122 contains the names of all objects in standard-set 190, as is further described in FIG. 6. In an alternative embodiment, name list 122 contains the names of all objects in local standard-set 118, as is further described in FIG. 5.

In the preferred embodiment, network connection 108 is a TCP/IP network connection, although it could be any type of suitable network connection. Client computer 100 is connected to network 200 via telephone lines, cable lines, or by wireless communications.

Client computer 100 may be implemented using any suitable client computer, such as an IBM personal computer running the OS/2® operating system. Client computer 100 could be connected directly to network 200 via network connection 108 or could be connected indirectly, such as via a Local Area Network, not shown.

Document-server computer 150 contains Central Processing Unit (CPU) 152 connected via bus 153 to network connection 154 and memory 156. Network connection 154 connects document-server computer 150 to network 200. Memory 156 contains server daemon program 158, documents 160, and linked objects 163. Although only one document-server computer is shown in FIG. 1, there may actually be a multiplicity of document-server computers. Although document-server computer 150 is shown as being directly connected to network 200, it could be connected indirectly such as via a Local Area Network, not shown.

Server daemon program 158 contains computer executable instructions that, when executed on CPU 152, provide support for connecting document-server computer 150 to network 200 via network connection 154 and responding to requests from client computer 100.

Documents 160 are HTML (Hyper Text Markup Language) documents in the preferred embodiment. Documents 160 contain pointers to linked objects 163, as is further described under the description for FIG. 2. HTML consists of tag specifications and text to be displayed. Tag specifications may or may not include tag modifiers that affect how the display text and multimedia objects are displayed. HTML documents are purely textual and are instructions to the browser as to what to display or play back, as well as attributes (such as size or location on the page) to apply to what is displayed or played back. A developer of an HTML document may directly hand generate the HTML text or may use one of many tools to assist in this generation. The developer may also develop, search for, or buy multimedia objects (digitized graphic, sound files, or video files) to specify in the HTML text so as to cause their display or play back by the browser upon parsing the HTML.

Linked objects 163 are objects used by documents 160 and referenced by documents 160 via hyperlinks. Although linked objects 163 are shown as being contained in document-server computer 150, they could be on any server in network 200. Linked objects 163 are further described in FIG. 2.

Standard-set server computer 175 contains Central Processing Unit (CPU) 182 connected via bus 183 to network connection 184 and memory 186. Network connection 184 connects standard-set server computer 175 to network 200. Memory 186 contains server daemon program 188, standard-set objects 190, and name list 192. Although standard-set server computer 175 is shown as being directly connected to network 200, it could be connected indirectly such as via a Local Area Network.

Server daemon program 188 contains computer executable instructions that, when executed on CPU 182, provide support for connecting standard-set server computer 175 to network 200 via network connection 184 and responding to requests from client computer 100. Standard-set multimedia objects 190 contain all locale-specific sets of standard multimedia objects. In the preferred embodiment, standard-set multimedia objects 190 is organized into directories with each separate locale having its locale-specific standard objects in a separate directory, as further described in FIG. 3. Name list 192 contains the names of all objects in all locales of standard-set 190.

Client computer 100, document-server computer 150, and standard-set server computer 175 may be implemented using any suitable server such as the AS/400® computer system, running the OS/400® operating system, both products of International Business Machines Corporation, located in Armonk, N.Y.

Client computer 100, document-server computer 150, and standard-set server computer 175 could be other types of computer systems, whether they be microcomputers such as an Apple Macintosh or mainframe computers such as an IBM System/390, and still fall within the spirit and scope of this invention. In addition, client computer 100, document-server computer 150, and server computer 175 could be microcomputers such as described above but connected to a larger computer system. Client computer 100 could also be a computer such as an Internet appliance or thin client that does not have a fixed disk drive. It will be readily appreciated that the principles of the invention may apply to other computer applications, such as other mainframes, minicomputers, network servers, supercomputers, personal computers, or workstations, as well as other electronics applications. Therefore, while the discussion herein focuses on a particular application, the invention should not be limited to the particular hardware designs, software designs, communications protocols, performance parameters, or application-specific functions disclosed herein.

FIG. 2 is a block diagram of an example of locale-specific, standard-set objects and their relationship to documents. Client computer 100 contains downloaded document 160a, local standard-set objects 118, and name list 122. In this example, client computer 100, in Mexico, is connected to document-server computer 150, in the United States, via network 200. Document-server computer 150 contains document 160 and linked objects 163. Local standard-set objects 118 could have been initially downloaded to client computer 100 from standard-set server computer 175 or could be loaded from CD-ROM or other storage.

Document 160a downloaded from document 160 at server computer 150 contains HTML tags. Document 160 may contain embedded URLs that link to objects or documents on the same or other servers.

Standard-set objects 118 could include text, bitmaps, audio, code, and video files named in a standard way. Code could include instructions capable of being executed on or interpreted by a computer, such as Java applications. Objects that would be candidates for inclusion in this set are those that would be typical choices by WWW document developers for embedding in their documents. Such objects might include the following: bullets of different colors and styles for enumerating list items; different "under construction" images (many WWW pages state that they are "under construction" and some include some kind of construction related bitmap image); left and right arrows labeled "previous" and "next"; paragraph or section separator lines; images exclaiming "new", "for sale", or "moved"; mail-oriented, bitmap images (since often WWW documents include an e-mail address of a primary contact); construction sound files (to go along with the "under construction" images); sounds of digitized speech for the speaking of each numeral and special symbols (e.g. "dollars"); many different bitmaps to tile in the document background; and Java applications. Examples of graphical multimedia objects are images of the JPEG format (Joint Photographic Experts Group) or the GIF (Graphics Interchange Format) format.

HTML provides the capability for multimedia objects to have a filename associated with them, which browsers typically retrieve from the same server as the HTML document came from. Browser 120 recognizes certain filenames as being part of the standard-set of objects and redirects the retrieval from local standard-set objects 118 on client computer 100. In this way, the normal HTML language itself is used unchanged and HTML documents embedding the standard-set objects are compatible with browsers that do not support this feature; they will retrieve the object from the server specified in the URL, as is normal.

Browser 120 parses downloaded document 160a, extracts the file names (stdset1.gif and stdset2.gif in this example) from image tags 161a and 161b and determines that the file names are contained in name list 122. Consequently, browser 120 retrieves corresponding objects 118a and 118b from local standard-set objects 118 instead of downloading objects 163a and 163b from linked objects 163. Thus, in this example, browser 120 displays to the user the information in corresponding locale-specific Spanish objects 118a and 118b instead of English objects 163a and 163b, which may have been originally created by the document developer on document-server computer 150, downloaded from standard-set server computer 175, or copied from another source such as CD-ROM or a Local Area Network.

Standard-set 118 is optionally segmented into subsets, each subset being specific to a particular language, culture, or locale. In this example, only one locale-specific subset, Spanish, is shown. But, standard-set 118 could optionally contain all locale-specific subsets with the browser 120 giving the user the choice of which locale-specific subset to use.

Figure 3:
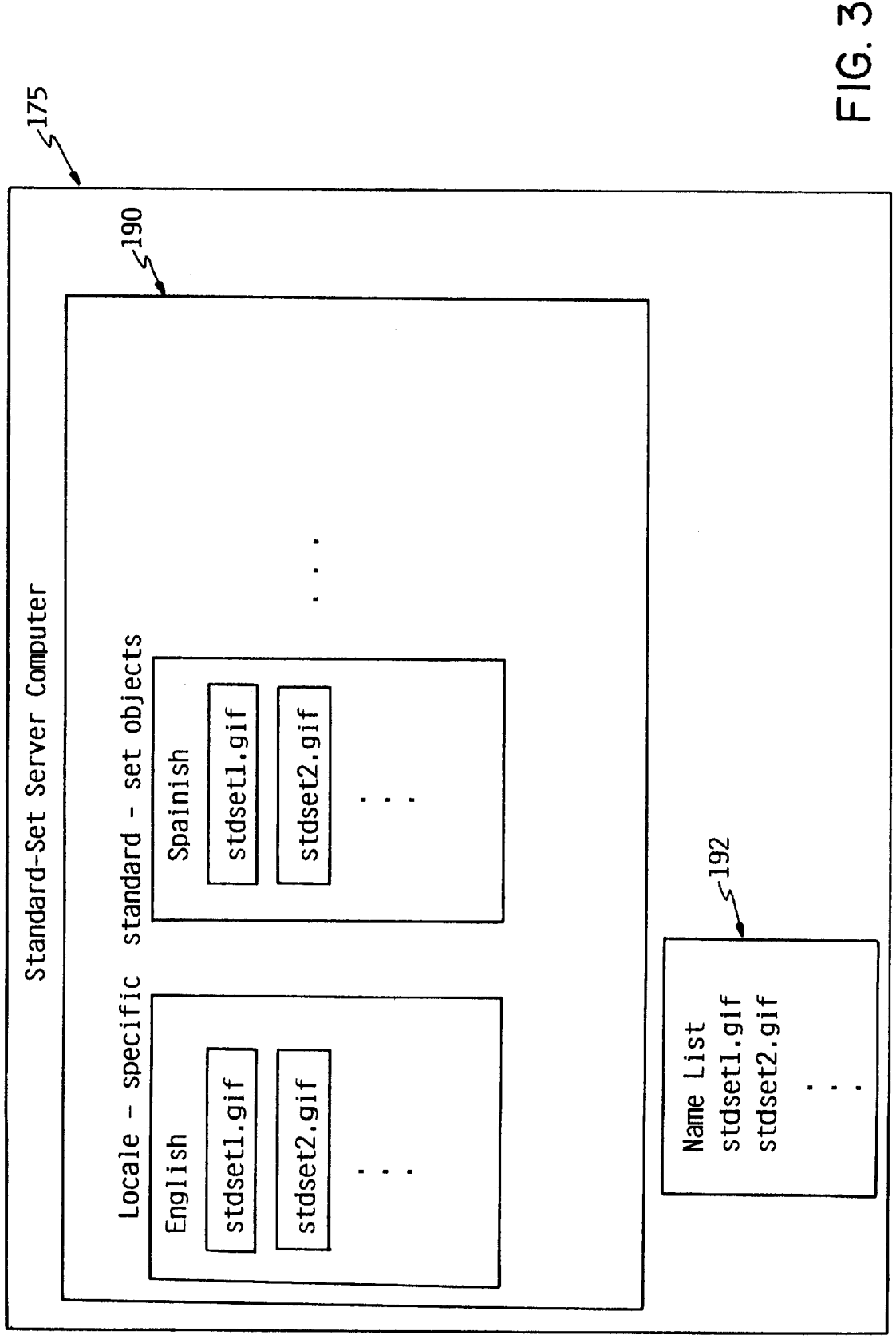
FIG. 3 is a block diagram of an example of locale-specific, standard-set objects and a name list at a standard-set server computer.

FIG. 3 is a block diagram of an example of locale-specific, standard-set objects and a name list at a standard-set server computer. Standard set server computer 175 contains locale-specific standard-set objects 190 and name list 192. Locale-specific standard-set objects 190 contains all the objects for every locale. In this example, subsets of objects in the English and Spanish languages are shown.

Figure 4A:
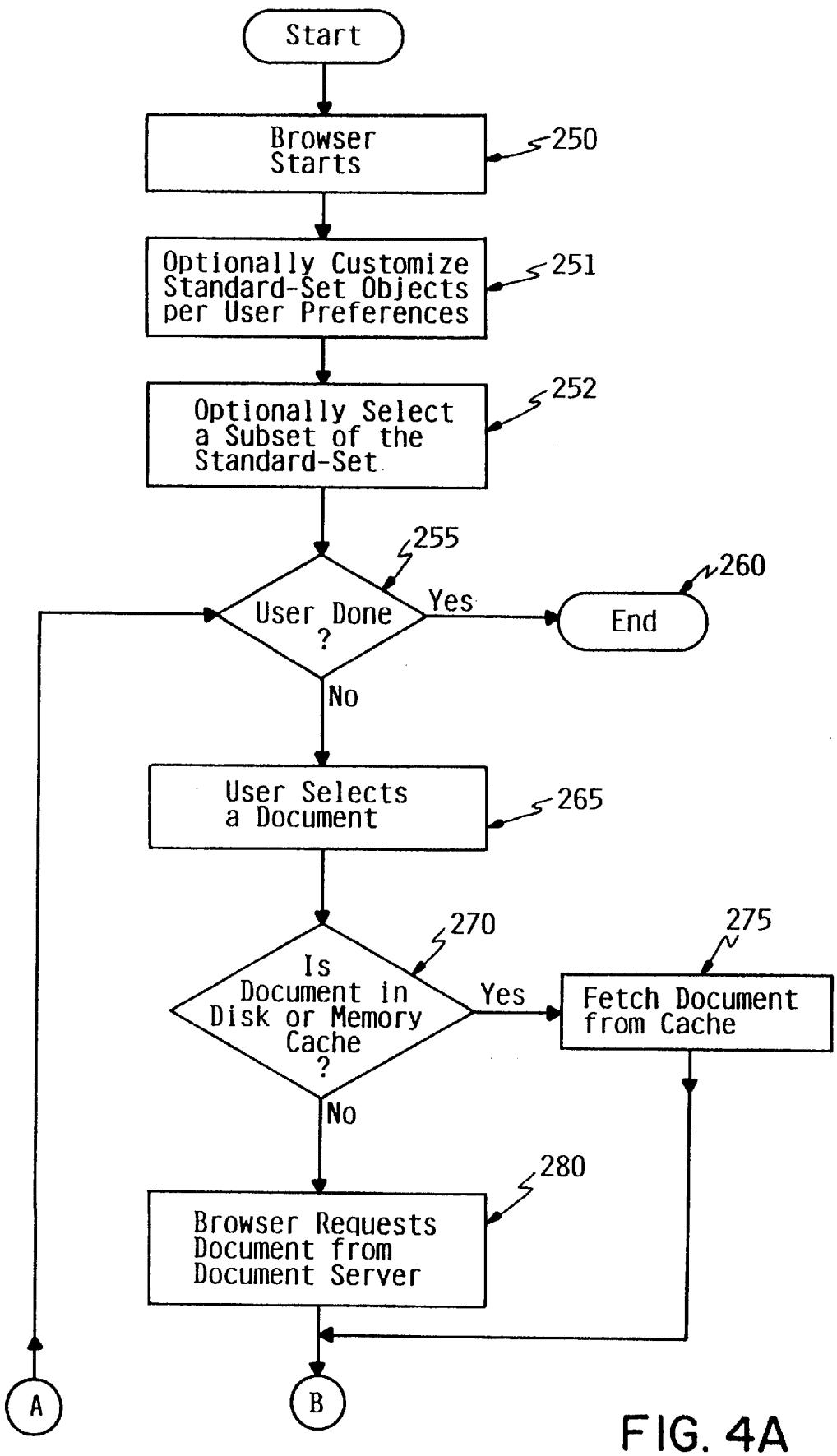
FIG. 4 is a flowchart that describes the operation of the preferred embodiment.
Figure 4B:
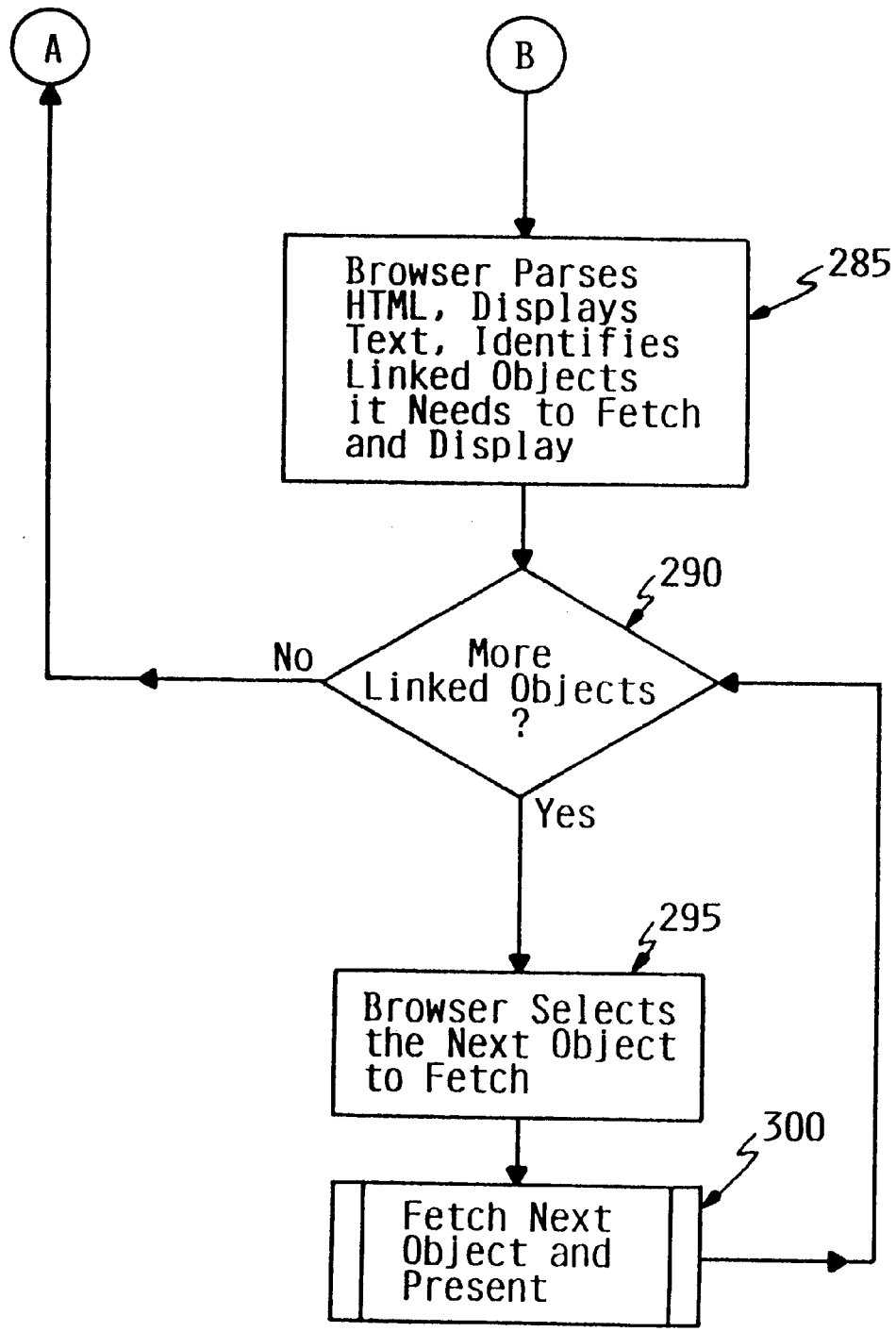

FIG. 4 depicts a flowchart of the process whereby browser 120 is used by a user to browse documents 160. At block 250, the user activates browser 120. At block 251, browser 120 optionally provides support for the user customizing standard-set objects 118 according to the user's preferences. For example, browser 120 could allow the user to add to and/or replace text fonts, button types, heading styles, or "under construction" icons in the standard-set.

Flow of browser 120 now continues to block 252, where browser 120 optionally allows the user to select which subset of standard-set objects 118 to use. Standard-set 118 is optionally segmented into subsets, each subset being specific to a particular language, culture, or locale. The user's selected subset is optionally downloaded from standard-set server computer 175 or multiple locale-specific subsets of the standard-set could be stored locally such as on a CD-ROM, or a LAN, or in local storage to client computer 100, and the user selects one subset to use. In this way standard-set objects 118 allows customization of document viewing to the user's language or culture. This could be helpful for computers that are located at an airport, library, or other such place where people of different cultural backgrounds frequent. Browser 120 is configured to be able to access any of these locale-specific subsets. The browser also allows the user to easily and quickly tell it the preferred locale. For example, a Japanese woman walks up to such a computer, and tells the browser she is Japanese. An American man walks up to another such computer, and tells it he is an American. If WWW documents that use standard-set objects are browsed by these users, not only will browsing efficiency be improved for them, but comprehension of the meaning of the documents will be increased because each will see the standard-set objects appropriately internationalized. Even if some objects as stored on the document-server would be sufficiently understood by all (which would not always be the case), to see or hear versions of such objects that have been internationalized for the user's specific locale provides the user with a higher level of satisfaction.

Flow of browser 120 now continues to block 255, browser 120 checks to see if the user wishes to exit. If the user wishes to exit, browser 120 terminates at block 260. If the user wishes to continue, browser 120 provides the user the capability to browse a document. The user selects document 160 on document-server computer 150. In the preferred embodiment, the user selects the desired WWW documents by specifying a URL to browser 120. A URL (Uniform Resource Locator) is the citation system for the Internet, and it identifies the location address (both the server name and the location within the server) of the document of interest. The standard format for an Internet URL is "service:// hostname/directory path/filename." At block 270, browser 120 determines whether the document specified by the URL is already in memory cache 114 or disk cache 116. If the check at block 270 is true, browser 120 fetches the specified document from the appropriate cache at block 275 and continues to block 285. If the check at block 270 is false, browser 120 sends the user-specified URL via network 200 to document-server computer 150, as shown at block 280. Document-server computer 150 then transmits the HTML document located in documents 160 back to browser 120, which creates downloaded document 160a.

Regardless of whether browser 120 obtained downloaded document 160a from memory cache 114, disk cache 116, or documents 160, at block 285 browser 120 parses the HTML in the document, displays whatever text is displayable, and identifies any linked objects that need further processing. At block 290, browser 120 checks whether there are any linked objects that still need processing. If there are linked objects that need processing, at block 295 browser 120 selects the next object to fetch. At block 300, browser 120 fetches and presents the information in the next object. The preferred embodiment for block 300 is more fully described under the description for FIG. 6, while an alternative embodiment for block 300 is more fully described under the description for FIG. 5. After the object is presented to the user, flow continues back to block 290. When all linked objects have been presented, browser 120 returns to block 255.

Figure 5:
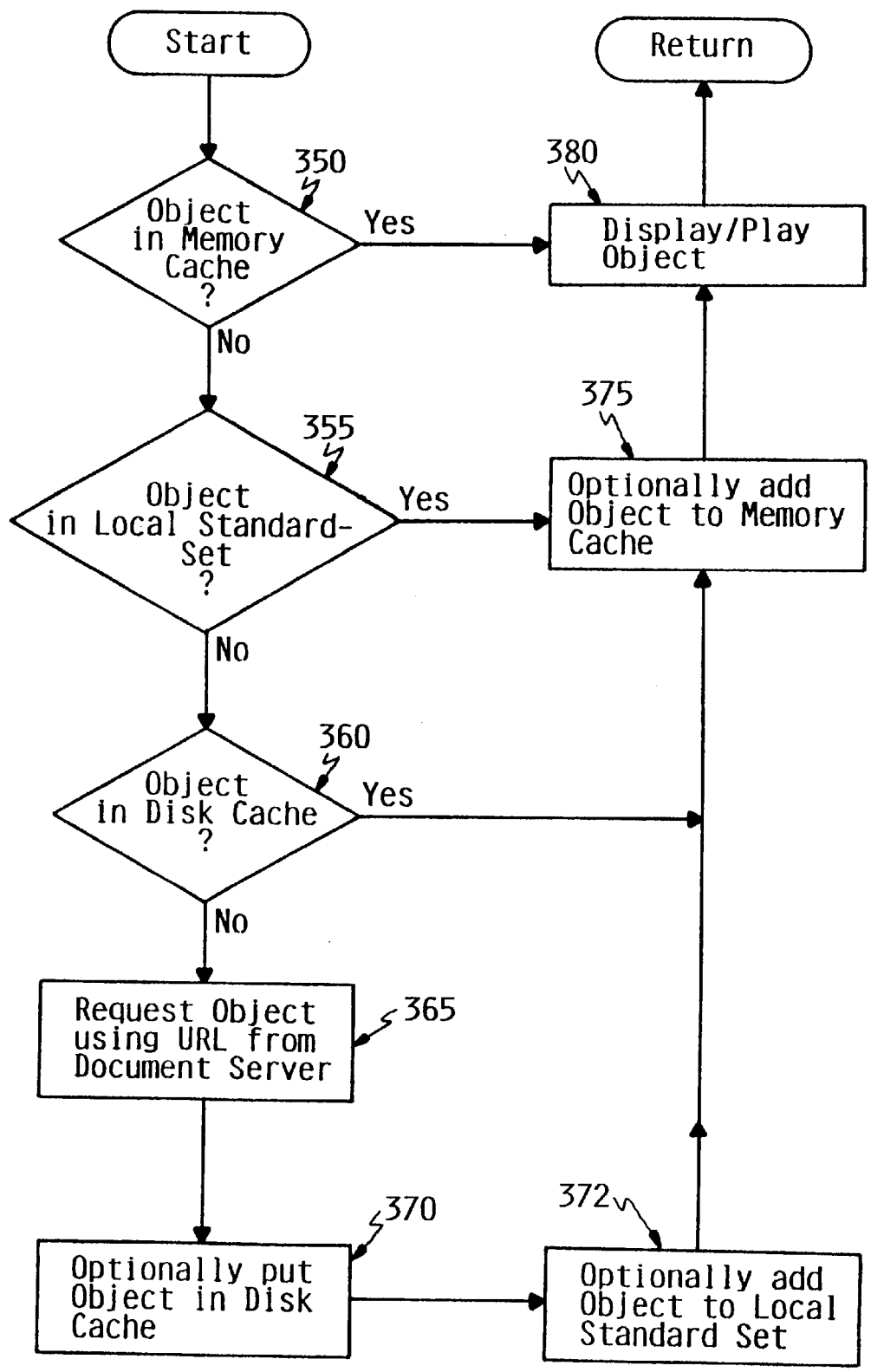
FIG. 5 is a flowchart that describes the operation of an alternative embodiment.

FIG. 5 depicts the flowchart of the process whereby browser 120 fetches objects and presents them to the user in an alternative embodiment. At block 350, browser 120 checks whether the object linked by downloaded document 160a is in memory cache 114 by comparing the full URL embedded in downloaded document 160a to the contents of memory cache 114. If the linked object is not found using its full URL, browser 120 extracts the file name from the embedded URL and compares it to the contents of memory cache 114. (If a standard-set object has been cached in memory, it is known and stored by file name only.) If the linked object is again not in memory cache 114, then at block 355 browser 120 checks whether the linked object has a corresponding object stored in local standard-set objects 118 by comparing the extracted file name to the contents of name list 122. If the linked object does not have a corresponding object in standard-set 118, at block 360 browser 120 checks whether the linked object is in disk cache 116 by comparing the URL embedded in downloaded document 160a to the contents of disk cache 116. If the linked object is not in disk cache 116, at block 365, browser 120 requests the linked object from linked objects 163 on document-server computer 150 using the embedded URL from document 160a. As explained above, linked objects 163 could be at any network server. Browser 120 then optionally stores the linked object in disk cache 116 (block 370), optionally stores the linked object in local standard-set objects 118 and adds the file name to name list 122 (block 372), and optionally stores the linked object by full URL, or by file name only if the object was added to the local standard set, in memory cache 114 (block 375). Browser 120 then presents the object to the user via display device 106 by displaying it or playing it, according to the type of media the linked object is designed for, as shown at block 380. Flow now returns to FIG. 5, block 290.

If the linked object is in memory cache 114 (block 350), the flow of browser 120 continues to block 380 where the linked object is presented to the user, as described above.

If the linked object is not in memory cache 114 (block 350), but the linked object is stored in local standard-set objects 118 (block 355), then the flow of browser 120 goes to block 375 where the locale-specific linked object is retrieved from local standard-set objects 118 and optionally stored by file name only in memory cache 114. Flow then continues to block 380, as described above.

If the linked object is not in memory cache 114 (block 350), the linked object is not stored in local standard-set objects 118 (block 355), but the linked object is in disk cache 116 (block 360), then the flow of browser 120 goes to block 375 where the linked object is optionally stored by full URL in memory cache 114. Flow then continues to block 380, as described above.

Figure 6:
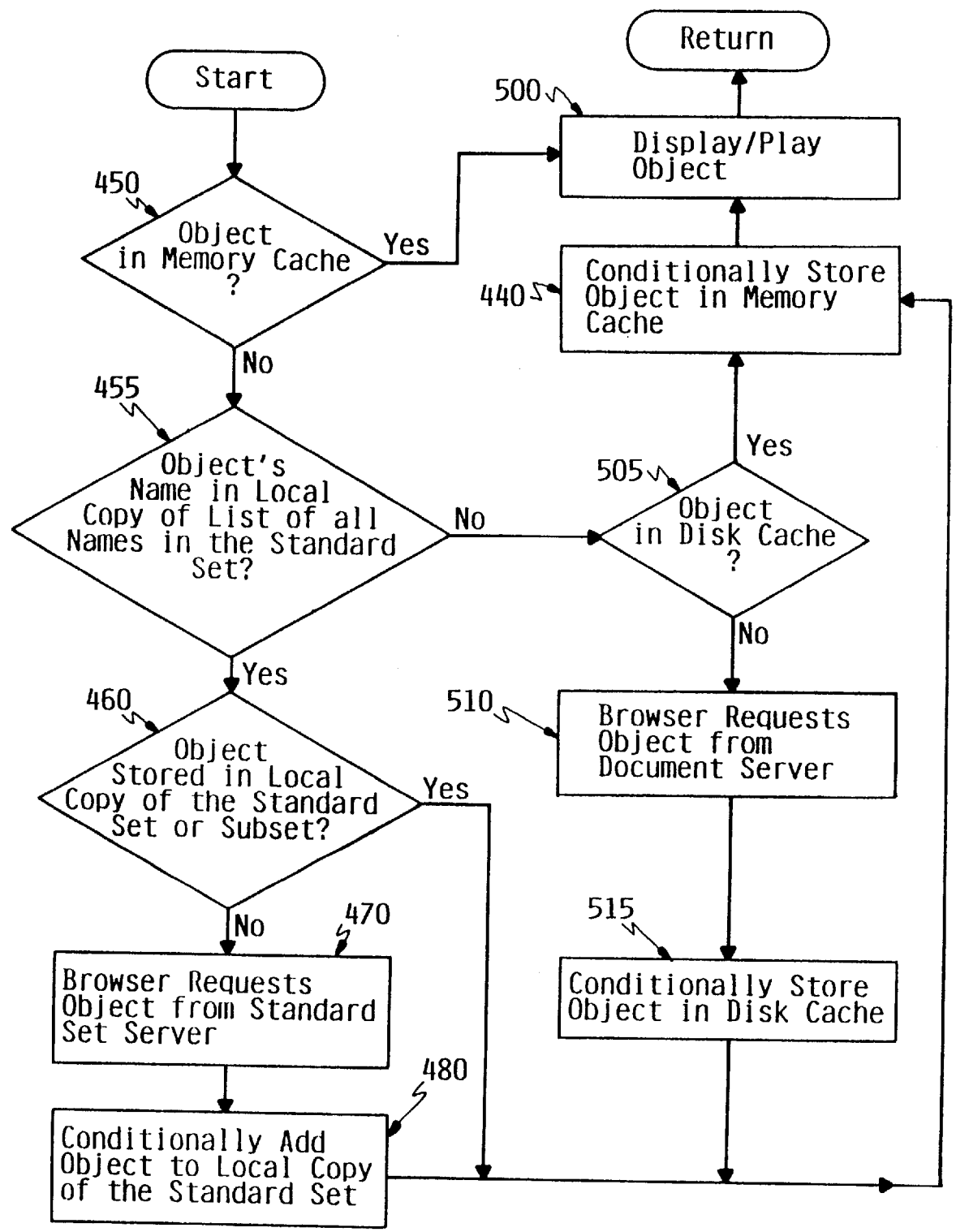
FIG. 6 is a flowchart that further describes the operation of the preferred embodiment.

FIG. 6 depicts the flowchart of the process whereby browser 120 fetches linked objects and presents them to the user in the preferred embodiment. At block 450, browser 120 checks whether the linked object is in memory cache 114 by comparing the full URL embedded in downloaded document 160a to the contents of memory cache 114. If the linked object is not found using its full URL, browser 120 extracts the file name from the embedded URL and compares it to the contents of memory cache 114. (If a standard-set object has been cached in memory, it is known and stored by file name only.) If the linked object is again not in memory cache 114, then at block 455 browser 120 compares the extracted file name to the contents of name list 122. If the linked object's name is in name list 122 of the name list, then browser 120 checks whether the linked object has a corresponding object present in local standard-set objects 118 at block 460. If a corresponding object is not present in local standard-set objects 118, then, at block 470, browser 120 requests the linked object from locale-specific standard-set 190 at standard-set server computer 175. In the preferred embodiment, browser 120 modifies the embedded URL for the locale of its user, so as to use the appropriate directory of locale-specific set 190. In an alternative embodiment, browser 120 passes a parameter in the URL indicating its locale, and server 175 returns the appropriate object from standard set 190. Browser 120 then, at the user's option, adds the linked object to local standard-set objects 118 at block 480. Browser 120 then optionally stores the linked object by filename only in memory cache 114 at block 490, and presents information in the object to the user via display device 106 by displaying it, playing it, or executing it according to the type of media the linked object is designed for, as shown at block 500. Flow now returns to FIG. 5, block 290.

If the linked object is not in memory cache 114 at block 450 and the linked object's name is in name list 122 at block 455 and the corresponding object is present in local standard-set objects 118 at block 460, then the flow of browser 120 continues to block 490, as described above.

If the linked object is not in memory cache 114 (block 450) and the linked object's name is not in name list 122 (block 455), then browser 120 checks whether the linked object is contained in disk cache 116 at block 505. If the linked object is contained in disk cache 116 (block 505), then flow continues to block 490, as described above. If the linked object is not in disk cache 116, then browser 120 requests the linked object from linked objects 163 in document-server computer 150 at block 510 and optionally stores the object in disk cache 116 at block 515, after which flow continues to block 490, as described above.

If the linked object is in memory cache 114 (block 450), the flow of browser 120 continues to block 500 where the linked object is presented to the user.

Figure 7:
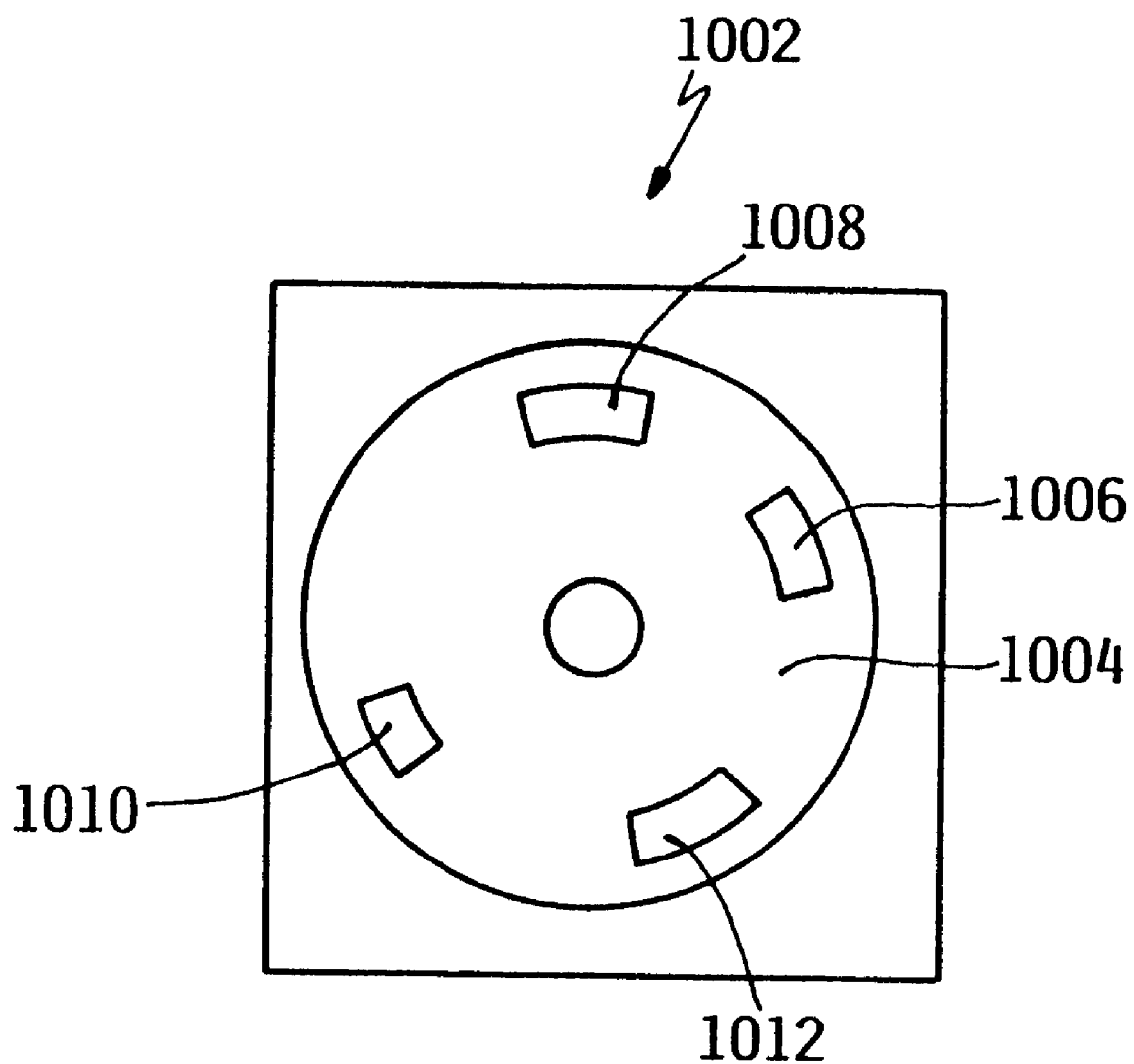
FIG. 7 is a block diagram of an article of manufacture or a computer program product including a storage medium for storing thereon program means for carrying out the method of this invention in the client computer of FIG. 1.

FIG. 7 shows an article of manufacture or a computer program product including a storage medium for storing thereon program means for carrying out the method of this invention in the system of FIG. 1. While the present invention has been described in the context of a computer system, the mechanisms of the present invention are capable of being distributed as a program product in a variety of forms, and the present invention applies equally regardless of the particular type of signal bearing media used to actually carry out the distribution. Examples of signal bearing media include: recordable type media, such as floppy disks and CD ROMs, and transmission type media such as digital and analog communications links.

An example of such an article of manufacture is illustrated in FIG. 7 as prerecorded floppy disk 1002. Floppy disk 1002 is intended for use with a data processing system, and includes magnetic storage medium 1004, and program means 1006, 1008, 1010, and 1012 recorded thereon, for directing browser 120 to facilitate the practice of this invention. It will be understood that such apparatus and articles of manufacture also fall within the spirit and scope of this invention.

While this invention has been described with respect to the preferred and alternative embodiments, various changes in detail may be made therein without departing from the spirit, scope, and teaching of the invention. For example, the type of browsers, documents, and linked objects may change from what is known today. In addition, computer and network technology may become widely employed in consumer applications such as in television sets and automobiles. Accordingly, the herein disclosed invention is to be limited only as specified in the following claims.

What is claimed is:

1. A document manager for operation at a client computer, wherein the client computer is connected via a network to a document-server computer, the document manager comprising:

a name list of a plurality of objects in a standard-set, wherein the standard-set objects contain information for presentation to a user of the client computer; and a browser that receives a document from the document-server computer, wherein the document comprises at least one embedded link, wherein the embedded link specifies an address of a linked object, and wherein the address points to an object-server computer in the network, and wherein the browser extracts a file name of the linked object from the embedded link, and wherein the browser determines whether the file name exists in the name list, and when the file name is not in the name list, the browser uses the address to retrieve the linked object from the object-server computer and presents information in the linked object and information in the document to the user, and when the file name is in the name list, the browser substitutes a corresponding standard-set object for the linked object and presents information in the corresponding standard-set object and information in the document to the user, wherein the corresponding standard-set object has a name identical to the file name, and wherein the information in the corresponding standard-set object is different from the information in the linked object.

2. The document manager of claim 1, wherein the plurality of standard-set objects are located in the client computer.

3. The document manager of claim 2, wherein the browser further initially loads the plurality of standard-set objects to the client computer from a standard-set server computer connected to the network.

4. The document manager of claim 1, wherein the plurality of standard-set objects are located in a local area network connected to the client computer.

5. The document manager of claim 1, wherein the plurality of standard-set objects are located in storage attached to the client computer.

6. The document manager of claim 1, wherein the object-server computer equals the document-server computer.

7. The document manager of claim 1, wherein the object-server computer is different from the document-server computer.

8. The document manager of claim 1, wherein the information in the corresponding standard-set object is video.

9. The document manager of claim 1, wherein the information in the corresponding standard-set object is audio.

10. The document manager of claim 1, wherein the information in the corresponding standard-set object is graphic.

11. The document manager of claim 1, wherein the information in the corresponding standard-set object is text.

12. The document manager of claim 1, wherein the information in the corresponding standard-set object is code.

13. The document manager of claim 1, wherein the information in the plurality of standard-set objects is customized for a language different from the language of the linked object.

14. The document manager of claim 13, wherein, the browser provides the user the option of selecting which language to use.

15. The document manager of claim 1, wherein the browser further adds the linked object to the plurality of standard-set objects.

16. The document manager of claim 1, wherein the browser further allows the user to customize the plurality of standard-set objects.

17. A method in a client computer for browsing, wherein the client computer is connected via a network to a document-server computer, comprising the machine executed steps of:

receiving a document from the document-server computer, wherein the document comprises at least one embedded link, wherein the embedded link specifies an address of a linked object, and wherein the address points to an object-server computer in the network;

extracting a file name of the linked object from the embedded link;

determining whether the linked object has a corresponding object in a plurality of standard-set objects by comparing the file name of the linked object to the names of the plurality of standard-set objects;

when a corresponding standard-set object does not exist in the plurality of standard-set objects, using the address to retrieve the linked object from the object-server computer and presenting information in the linked object to a user; and when the corresponding object does exist in the plurality of standard-set objects, substituting a corresponding standard-set object for the linked object and presenting information in the corresponding standard-set object to the user instead of retrieving the linked object, and wherein the information in the corresponding standard-set object is different from the information in the linked object.

18. The method of claim 17, wherein the information in the corresponding standard-set object is customized to the language of the user of the client computer.

19. The method of claim 17, wherein the object-server computer equals the document-server computer.

20. The method of claim 17, wherein the object-server computer is different from the document-server computer.

21. The method of claim 17, wherein the information in the corresponding standard-set object is video.

22. The method of claim 17, wherein the information in the corresponding standard-set object is audio.

23. The method of claim 17, wherein the information in the corresponding standard-set object is graphic.

24. The method of claim 17, wherein the information in the corresponding standard-set object is text.

25. The method of claim 17, wherein the information in the corresponding standard-set object is code.

26. The method of claim 17, further comprising initially loading the plurality of standard-set objects from secondary storage associated with the client computer.

27. The method of claim 17, further comprising initially loading the plurality of standard-set objects from a standard-set server computer connected to the network.

28. The method of claim 17, further comprising providing the user with an option of selecting which subset of the plurality of standard-set objects to use wherein the standard-set objects comprise a plurality of subsets each customized for a different language.

29. The method of claim 17, further comprising adding the linked object to the plurality of standard-set objects.

30. The method of claim 17, further comprising customizing the plurality of standard-set objects according to the user's preferences.

31. A program product, the program product comprising:

a name list of a plurality of standard-set objects, wherein the standard-set objects contain information for presentation to a user of a client computer;

a browser that receives a document from a document-server computer connected via a network to the client computer, wherein the document comprises at least one embedded link, wherein the embedded link specifies an address of a linked object, and wherein the address points to an object-server computer in the network, and wherein the browser extracts a file name of the linked object from the embedded link, and wherein the browser determines whether the file name exists in the name list, and when the linked object does not have a corresponding object in the standard-set, the browser retrieves the linked object from the object-server computer and presents information in the linked object to the user, and when the linked object has a corresponding object in the standard-set, the browser substitutes a corresponding standard-set object for the linked object and presents information in the corresponding standard-set object to the user instead of retrieving the linked object, and wherein the information in the corresponding standard-set object is different from the information in the linked object; and signal bearing media bearing the name list and the browser.

32. The program product of claim 31, wherein the information in the corresponding standard-set object is customized to the language of a user of the client computer.

33. The program product of claim 31, wherein the object-server computer equals the document-server computer.

34. The program product of claim 31, wherein the object-server computer is different from the document-server computer.

35. The program product of claim 31, wherein the information in the corresponding standard-set object is video.

36. The program product of claim 31, wherein the information in the corresponding standard-set object is audio.

37. The program product of claim 31, wherein the information in the corresponding standard-set object is graphic.

38. The program product of claim 31, wherein the information in the corresponding standard-set object is text.

39. The program product of claim 31, wherein the information in the corresponding standard-set object is code.

40. The program product of claim 31, wherein the browser further initially loads the plurality of standard-set objects from secondary storage associated with the client computer.

41. The program product of claim 31, wherein the browser further initially loads the plurality of standard-set objects from a standard-set computer connected to the network.

42. The program product of claim 31, wherein the plurality of standard-set objects further comprise a plurality of subsets, wherein each subset is customized for a different language, and the browser provides the user the option of selecting which subset to use.

43. The program product of claim 31, wherein the browser further copies the linked object to the standard-set.

44. The program product of claim 31, wherein the browser further allows the user to customize the standard-set objects.

45. The program product of claim 31, wherein the signal bearing media comprises recordable media.

46. The program product of claim 31, wherein the signal bearing media comprises transmission media.

47. A client computer, wherein the client computer is connected via a network to a document-server computer, the client computer comprising:

a memory;

a processor;

a name list of a plurality of standard-set objects, wherein the standard-set objects contain information for presentation to a user of the client computer; and a browser, executing on the processor, wherein the browser receives a document from the document-server computer, wherein the document comprises at least one embedded link, wherein the embedded link specifies an address of a linked object, and wherein the address points to an object-server computer in the network, and wherein the browser extracts a file name of the linked object from the embedded link, and wherein the browser determines whether the file name exists in the name list, and when the file name is not in the name list, the browser uses the address to retrieve the linked object from the object-server computer and presents information in the linked object and information in the document to the user, and when file name is in the name list, the browser substitutes a corresponding standard-set object for the linked object and presents information in the corresponding standard-set object and information in the document to the user instead of retrieving the linked object, and wherein the information in the corresponding standard-set object is different from the information in the linked object.

* * * * *